(12) United States Patent
Bak et al.

(10) Patent No.: US 11,557,285 B2
(45) Date of Patent: Jan. 17, 2023

(54) ELECTRONIC DEVICE FOR PROVIDING INTELLIGENT ASSISTANCE SERVICE AND OPERATING METHOD THEREOF

(71) Applicant: Samsung Electronics Co., Ltd., Suwon-si (KR)

(72) Inventors: Hyeonjae Bak, Suwon-si (KR); Taegu Kim, Suwon-si (KR); Yoonju Lee, Suwon-si (KR); Hansin Koh, Suwon-si (KR); Jooyeon Kim, Suwon-si (KR); Gajin Song, Suwon-si (KR); Jaeyung Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 126 days.

(21) Appl. No.: 16/953,160

(22) Filed: Nov. 19, 2020

(65) Prior Publication Data

US 2021/0151040 A1 May 20, 2021

(30) Foreign Application Priority Data

Nov. 19, 2019 (KR) .................. 10-2019-0148893

(51) Int. Cl.
*G10L 15/22* (2006.01)
*G10L 15/18* (2013.01)
(Continued)

(52) U.S. Cl.
CPC .......... *G10L 15/1815* (2013.01); *G10L 15/22* (2013.01); *G10L 15/30* (2013.01); *G10L 2015/223* (2013.01); *H04L 67/01* (2022.05)

(58) Field of Classification Search
CPC .............................. G10L 15/22; G10L 15/30
See application file for complete search history.

(56) References Cited

U.S. PATENT DOCUMENTS

2014/0092007 A1 4/2014 Kim et al.
2016/0042748 A1 2/2016 Jain et al.
(Continued)

FOREIGN PATENT DOCUMENTS

KR 10-2010-0043360 A 4/2010
KR 10-2017-0086814 A 7/2017
KR 10-2019-0088945 A 7/2019

OTHER PUBLICATIONS

International Search Report and Written Opinion of the International Searching Authority in connection with International Application No. PCT/KR2020/016387 dated Mar. 9, 2021, 7 pages.

*Primary Examiner* — Ibrahim Siddo

(57) ABSTRACT

An electronic device includes at least one communication circuit, at least one microphone, at least one processor operatively connected to the at least one communication circuit and the at least one microphone, and at least one memory operatively connected to the at least one processor. The at least one memory is configured to store instructions. The at least one processor is configured to store intent masking information that defines an utterance processing target for at least one intent, in the memory. When an utterance indicating a speech based intelligent assistance service through the at least one microphone is received, the at least one processor is configured to determine that a processing target of the received utterance is one of the electronic device or a server connected through the at least one communication circuit, based on the intent masking information.

20 Claims, 14 Drawing Sheets

(51) Int. Cl.
*G10L 15/30* (2013.01)
*H04L 67/01* (2022.01)

(56) References Cited

U.S. PATENT DOCUMENTS

| | | |
|---|---|---|
| 2017/0206896 A1 | 7/2017 | Ko et al. |
| 2018/0122376 A1* | 5/2018 | Kojima .................. G10L 15/22 |
| 2018/0330731 A1 | 11/2018 | Zeitlin et al. |
| 2018/0366129 A1 | 12/2018 | Sung et al. |
| 2019/0026075 A1 | 1/2019 | Kim et al. |
| 2019/0189118 A1 | 6/2019 | Piernot et al. |

* cited by examiner

ELECTRONIC DEVICE FOR PROVIDING INTELLIGENT ASSISTANCE SERVICE AND OPERATING METHOD THEREOF

CROSS-REFERENCE TO RELATED APPLICATION

This application is based on and claims priority under 35 U.S.C. § 119 to Korean Patent Application No. 10-2019-0148893 filed on Nov. 19, 2019 in the Korean Intellectual Property Office, the disclosure of which is incorporated by reference herein in its entirety.

BACKGROUND

1. Field

Various embodiments of the disclosure relate to a method for providing an intelligent assistance service and an electronic device thereof.

2. Description of Related Art

In recent, an intelligent assistance service for providing an intuitive interface between users and electronic devices is developed. The intelligent assistance service may infer a user's intent by performing natural language processing on a user's utterance, and execute an action corresponding to a received voice input based on the inferred user intent.

SUMMARY

Typically, performance of an intelligent assistance service is associated with utterance recognition. An electronic device may autonomously recognize an utterance for a rapid response to the utterance recognition. However, utterance recognition performance of the electronic device is limited, and accordingly the utterance recognized by the electronic device is limited in number or in type.

In addition, the electronic device may request the utterance recognition by transmitting utterance data to a server, to acquire a more accurate and precise result of the utterance. However, such a method increases communication usage of the electronic device and causes a relatively slow response, which may degrade user satisfaction in using the intelligent assistance service.

Thus, various embodiments of the disclosure provide an electronic device for recognizing a user's utterance using a speech processing module of an electronic device and a speech processing module of a server, and an operating method thereof.

According to various embodiments of the disclosure, an electronic device may include at least one communication circuit, at least one microphone, at least one processor operatively connected to the at least one communication circuit and the at least one microphone, and at least one memory operatively connected to the at least one processor, wherein the at least one memory may store instructions, when executed, causing the at least one processor to store intent masking information which defines an utterance processing target for at least one intent, in the memory, and if receiving an utterance indicating a speech based intelligent assistance service through the at least one microphone, determine one of the electronic device or a server connected through the at least one communication circuit to a processing target of the received utterance, based on the intent masking information.

According to various embodiments of the disclosure, an operating method of an electronic device may include storing intent masking information which defines an utterance processing target for at least one intent, and if receiving an utterance indicating a speech based intelligent assistance service, determining one of the electronic device or a server which establishes communication with the electronic device, to a processing target of the received utterance, based on the intent masking information.

According to various embodiments of the disclosure, a server for supporting a speech based intelligent assistance service may include at least one communication circuit, at least one microphone, at least one processor operatively connected to the at least one communication circuit and the at least one microphone, and at least one memory operatively connected to the at least one processor, wherein the at least one memory may store instructions, when executed, causing the at least one processor to, receive an utterance and a first processing result of the utterance from an electronic device, through the at least one communication circuit, acquire a second processing result by processing the received utterance, generate intent masking information which defines an utterance processing target for at least one intent, based on the first processing result and the second processing result, and provide the generated intent masking information to the electronic device, through the at least one communication circuit.

According to various embodiments of the Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure will be described in detail with reference to the accompanying drawings. In describing the embodiment of the disclosure, if it is determined that a detailed description of a related known function or configuration may unnecessarily obscure the subject matter of the disclosure, the detailed description will be omitted. Terms to be described are terms defined in consideration of the functions of the disclosure, which may vary according to a user's or operator's intent or practice. Hence, their definition should be made based on contents throughout this specification.

Figure 1:
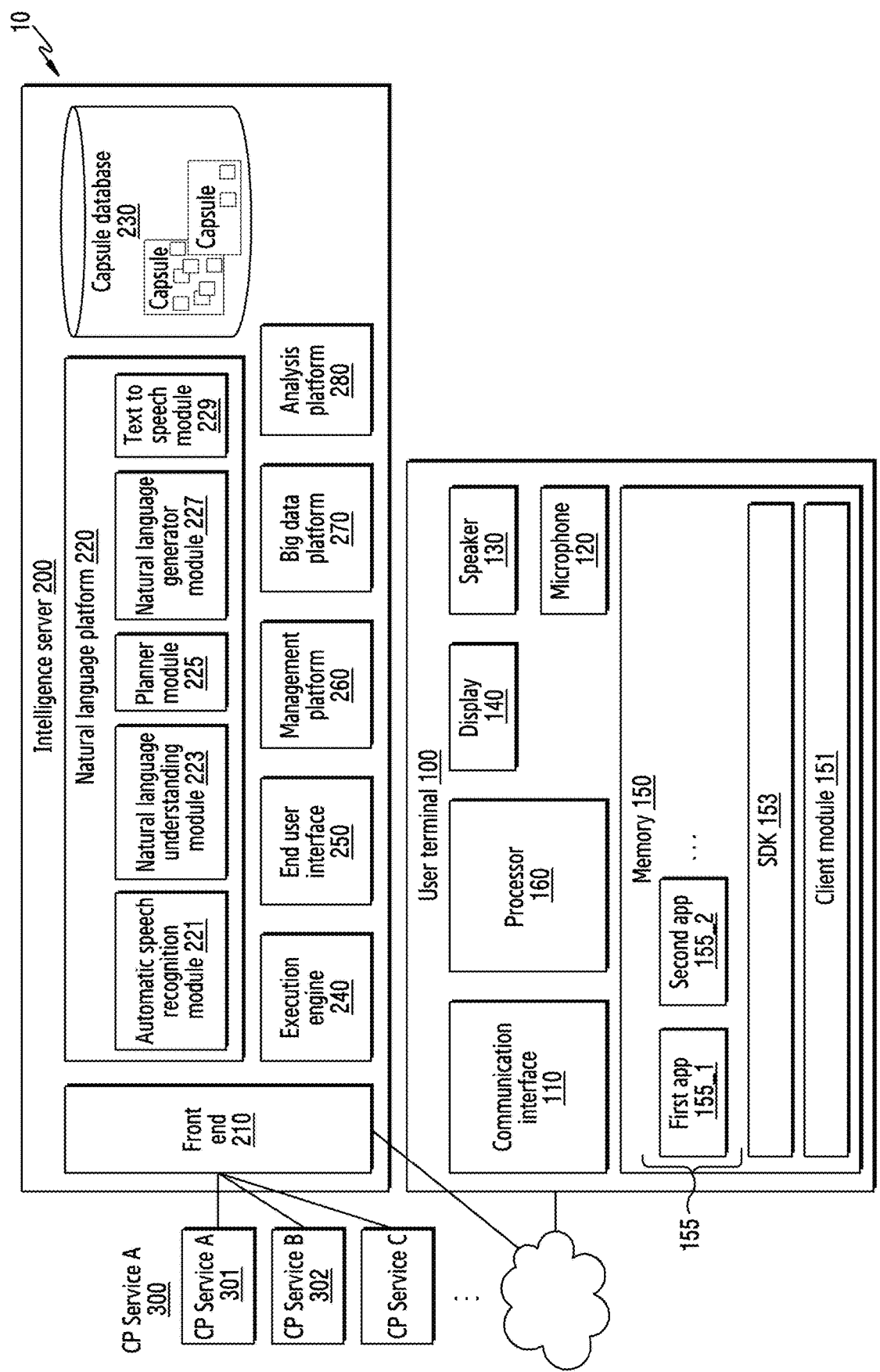
FIG. 1 illustrates a block diagram of an integrated intelligence system according to an embodiment.

FIG. 1 illustrates a block diagram of an integrated intelligence system according to an embodiment.

Referring to FIG. 1, an integrated intelligence system according to an embodiment may include a user terminal 100, an intelligent server 200, and a service server 300.

The user terminal 100 in an embodiment may be a terminal device (or an electronic device) for connecting to Internet, for example, a mobile phone, a smart phone, a personal digital assistant (PDA), a notebook computer, a television (TV), white goods, a wearable device, a head mounted device (HMD), or a smart speaker.

According to an embodiment, the user terminal 100 may include a communication interface 110, a microphone 120, a speaker 130, a display 140, a memory 150, or a processor 160. Such components may be operatively or electrically coupled with each other.

The communication interface 110 of an embodiment may be configured to transmit and receive data by connecting to an external device. The microphone 120 of an embodiment may receive and convert a sound (e.g., a user utterance) to an electric signal. The speaker 130 of an embodiment may output the electric signal as a sound (e.g., speech). The display 140 of an embodiment may be configured to display an image or a video. The display 140 of an embodiment may display a graphic user interface (GUI) of an app (or an application program) which is running.

The memory 150 of an embodiment may store a client module 151, a software development kit (SDK) 153, and a plurality of apps 155. The client module 151 and the SDK 153 may configure a framework (or a solution program) for executing general-purpose functionality. In addition, the client module 151 and the SDK 153 may configure a framework for processing a voice input.

The apps 155 stored in the memory 150 of an embodiment may be a program for performing designated functions. According to an embodiment, the apps 155 may include a first app 155_1 and a second app 155_3. According to an embodiment, the apps 155 may include a plurality of actions for executing the designated functions respectively. For example, the apps 155 may include an alarm app, a message app, and/or a schedule app. According to an embodiment, the apps 155 may be executed by the processor 160 to sequentially execute at least part of the actions.

The processor 160 of an embodiment may control operations of the user terminal 100. For example, the processor 160 may be electrically coupled with the communication interface 110, the microphone 120, the speaker 130, the memory 150, and the display 140 to perform designated operations.

The processor 160 of an embodiment may perform a designated function by executing a program stored in the memory 150. For example, the processor 160 may execute at least one of the client module 151 or the SDK 153, and thus perform the following actions to process a voice input. The processor 160 may, for example, control the actions of the apps 155 through the SDK 153. The following actions described as the actions of the client module 151 or the SDK 153 may be carried out by the processor 160.

The client module 151 of an embodiment may receive a voice input. For example, the client module 151 may receive a voice signal corresponding to a user utterance detected through the microphone 120. The client module 151 may transmit the received voice input to the intelligent server 200. The client module 151 may transmit status information of the user terminal 100 to the intelligent server 200, together with the received voice input. The status information may be, for example, execution state information of the app.

The client module 151 of an embodiment may receive a result corresponding to the received voice input. For example, if the intelligent server 200 may calculate the result corresponding to the received voice input, the client module 151 may receive the result corresponding to the received voice input. The client module 151 may display the received result on the display 140.

The client module 151 of an embodiment may receive a plan corresponding to the received voice input. The client module 151 may display a result of executing the actions of the app according to the plan, on the display 140. The client module 151 may, for example, sequentially display the execution results of the actions on the display 140. The user terminal 100 may display, for example, only some (e.g., the last action result) of the execution results of the actions on the display 140.

According to an embodiment, the client module 151 may receive a request for obtaining necessary information to calculate the result corresponding to the voice input, from the intelligent server 200. According to an embodiment, the client module 151 may transmit the necessary information to the intelligent server 200, in response to the request.

The client module 151 of an embodiment may transmit the execution result information of the actions based on the plan, to the intelligent server 200. The intelligent server 200 may identify that the received voice input is processed properly, using the result information.

The client module 151 of an embodiment may include an ASR module. According to an embodiment, the client module 151 may recognize a voice input for executing a limited function through the ASR module. For example, the client module 151 may execute an intelligent app for processing a voice input to perform an organized action through a designated input (e.g., Wake up!).

The intelligent server 200 of an embodiment may receive information relating to a user voice input from the user terminal 100 over a communication network. According to an embodiment, the intelligent server 200 may change data relating to the received voice input to text data. According to an embodiment, based on the text data, the intelligent server 200 may generate a plan for performing a task corresponding to the user voice input.

According to an embodiment, the plan may be generated by an artificial intelligent (AI) system. The AI system may be a rule-based system or a neural network-based system (e.g., a feedforward neural network (FNN) or a recurrent neural network (RNN)). Alternatively, the AI system may be a combination of them, or other AI system. According to an embodiment, the plan may be selected from a set of pre-defined plans, or may be generated in real time in response to a user request. For example, the AI system may select at least one plan from a plurality of predefined plans.

The intelligent server 200 of an embodiment may transmit the result according to the generated plan to the user terminal 100, or may transmit the generated plan to the user terminal 100. According to an embodiment, the user terminal 100 may display the result according to the plan, on the display 140. According to an embodiment, the user terminal 100 may display the result of the action execution according to the plan, on the display 140.

The intelligent server 200 of an embodiment may include a front end 210, a natural language platform 220, a capsule database (DB) 230, an execution engine 240, an end user interface 250, a management platform 260, a big data platform 270, or an analytic platform 280.

The front end 210 of an embodiment may receive the received voice input from the user terminal 100. The front end 210 may transmit a response corresponding to the voice input.

According to an embodiment, the natural language platform 220 may include an automatic speech recognition (ASR) module 221, a natural language understanding (NLU) module 223, a planner module 225, a natural language generator (NLG) module 227, or a text to speech (TTS) module 229.

The ASR module 221 of an embodiment may convert the voice input received from the user terminal 100 to the text data. The NLU module 223 of an embodiment may obtain user's intent by using the text data of the voice input. For example, the NLU module 223 may obtain the user's intent through syntactic analysis or semantic analysis. The NLU module 223 of an embodiment may obtain a meaning of a word extracted from the voice input using linguistic characteristics (e.g., grammatical elements) of a morpheme or a phrase, and determine the user's intent by matching the obtained word meaning to the intent.

The planner module 225 of an embodiment may generate the plan using the intent determined at the NLU module 223 and a parameter. According to an embodiment, the planner module 225 may determine a plurality of domains for executing a task, based on the determined intent. The planner module 225 may determine a plurality of actions of the domains determined based on the intent. According to an embodiment, the planner module 225 may determine a parameter required to execute the determined actions, or determine a result value outputted by executing the actions. The parameter and the result value may be defined as concepts of a designated type (or class). Hence, the plan may include a plurality of actions determined by the user's intent, and a plurality of concepts. The planner module 225 may determine relationships between the actions and between the concepts, by stages (or hierarchically). For example, the planner module 225 may determine an execution order of the actions determined based on the user's intent, based on the concepts. In other words, the planner module 225 may determine the execution order of the actions, based on the parameter for executing the actions and the result outputted by executing the actions. Hence, the planner module 225 may generate the plan including association information (e.g., ontology) between the actions, and between the concepts. The planner module 225 may generate the plan using information stored in the capsule DB 230 which stores a set of relationships of the concepts and the actions.

The NLU module 227 of an embodiment may change designated information into text. The information changed into the text may be in the form of a natural language speech.

The TTS module 229 of an embodiment may change the text information to voice information.

According to an embodiment, some or whole of the functions of the natural language platform 220 may be implemented at the user terminal 100.

The capsule DB 230 may store the relationship information of the concepts and the actions corresponding to the domains. The capsule according to an embodiment may include a plurality of action objects or action information and concept objects or concept information in the plan. According to an embodiment, the capsule DB 230 may store a plurality of capsules in the form of a concept action network (CAN). According to an embodiment, the capsules may be stored in a function registry of the capsule DB 230.

The capsule DB 230 may include a strategy registry which stores strategy information for determining the plan corresponding to the voice input. If a plurality of plans corresponds to the voice input, the strategy information may include reference information for determining one plan. According to an embodiment, the capsule DB 230 may include a follow up registry which stores follow up action information to suggest a follow up action to the user under a designated situation. The follow up action may include, for example, a follow up utterance. According to an embodiment, the capsule DB 230 may include a layout registry which stores layout information of the information outputted through the user terminal 100. According to an embodiment, the capsule DB 230 may include a vocabulary registry which stores vocabulary information of the capsule information. According to an embodiment, the capsule DB 230 may include a dialog registry which stores dialog (or interaction) information of the user. The capsule DB 230 may update the stored object with a developer tool. The developer tool may include, for example, a function editor for updating the action object or the concept object. The developer tool may include a vocabulary editor for updating the vocabulary. The developer tool may include a strategy editor for generating and registering a strategy to determine the plan. The developer tool may include a dialog editor for creating a dialog with the user. The developer tool may include a follow up editor for activating a follow up goal and editing the follow up utterance to provide a hint. The follow up goal may be determined based on a current goal, user's preference, or environmental condition. In an embodiment, the capsule DB 230 may be implemented in the user terminal 100.

The execution engine 240 of an embodiment may calculate a result using the generated plan. The end user interface 250 may transmit the calculated result to the user terminal 100. Hence, the user terminal 100 may receive the result, and provide the received result to the user. The management platform 260 of an embodiment may manage information used by the intelligent server 200. The big data platform 270 of an embodiment may collect user's data. The analytic platform 280 of an embodiment may manage quality of service (QoS) of the intelligent server 200. For example, the analytic platform 280 may manage the components and a processing rate (or efficiency) of the intelligent server 200.

The service server 300 of an embodiment may provide a designated service (e.g., food ordering or hotel booking) to the user terminal 100. According to an embodiment, the service server 300 may be a server operated by a third party. The service server 300 of an embodiment may provide the intelligent server 200 with information for generating the plan corresponding to the received voice input. The provided information may be stored in the capsule DB 230. In addition, the intelligent server 200 may provide result information based on the plan to the intelligent server 200.

In the integrated intelligence system 10 as describe above, the user terminal 100 may provide various intelligent services to the user in response to a user input. The user input may include, for example, an input via a physical button, a touch input, or a voice input.

In an embodiment, the user terminal 100 may provide a speech recognition service through an intelligent app (or a speed recognition app) stored therein. In this case, for example, the user terminal 100 may recognize a user utterance or a voice input received via the microphone, and provide the user with a service corresponding to the recognized voice input.

In an embodiment, based on the received voice input, the user terminal 100 may perform a designated action alone or with the intelligent server 200 and/or a service server. For example, the user terminal 100 may execute an app corresponding to the received voice input, and perform the designated action using the executed app.

In an embodiment, if the user terminal 100 provides the service together with the intelligent server 200 and/or the service server, the user terminal 100 may detect a user utterance using the microphone 120 and generate a signal (or voice data) corresponding to the detected user utterance. The user terminal 100 may transmit the voice data to the intelligent server 200 using the communication interface 110.

The intelligent server 200 according to an embodiment may generate a plan for executing a task corresponding to the voice input, or a result of the action execution according to the plan, in response to the voice input received from the user terminal 100. The plan may include, for example, a plurality of actions for executing the task corresponding to the user's voice input, and a plurality of concepts relating to the actions. The concept may define a parameter inputted to the execution of the actions, or a result value outputted by the execution of the actions. The plan may include association information between the actions, and between the concepts.

The user terminal 100 of an embodiment may receive the response using the communication interface 110. The user terminal 100 may output the voice signal generated in the user terminal 100 to outside using the speaker 130, or output an image generated in the user terminal 100 to outside using the display 140.

Figure 2:
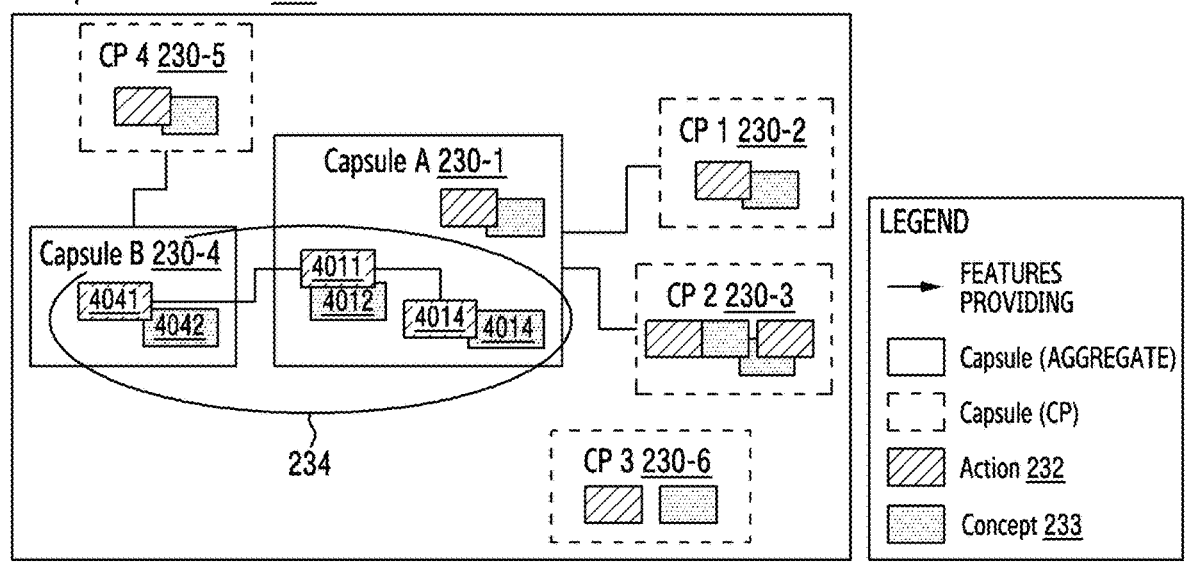
FIG. 2 illustrates a diagram of a relationship information of a concept and an action stored in a database according to various embodiments.

FIG. 2 illustrates a diagram of a relationship information of a concept and an action stored in a database according to various embodiments.

A capsule database (e.g., the capsule database 230) of the intelligent server 200 may store a capsule in the form of a CAN 231. The capsule database may store an action for processing a task corresponding to a user's voice input and a parameter necessary for the action, in the form of the CAN 231.

The capsule database may store a plurality of capsules (a capsule A 230-1 and a capsule B 230-4) corresponding to a plurality of domains (e.g., applications) respectively. According to an embodiment, one capsule (e.g., the capsule A 230-1) may correspond to one domain (e.g., a location, an application). Also, one capsule may correspond to at least one service provider (e.g., a CP 1 230-2 or a CP 2 230-3) for performing a function of a domain related with the capsule. According to an embodiment, one capsule may include at least one or more actions 232 and at least one or more concepts 233, for performing a designated function.

Using the capsule stored in the capsule database, the natural language platform 220 may generate a plan for performing a task corresponding to the received voice input. For example, the planner module 225 of the natural language platform 220 may generate the plan by using the capsule stored in the capsule database. For example, the planner module 225 may generate a plan 234 using actions 4011 and 4013 and concepts 4012 and 4014 of the capsule A 230-1 and an action 4041 and a concept 4042 of the capsule B 230-4.

Figure 3:
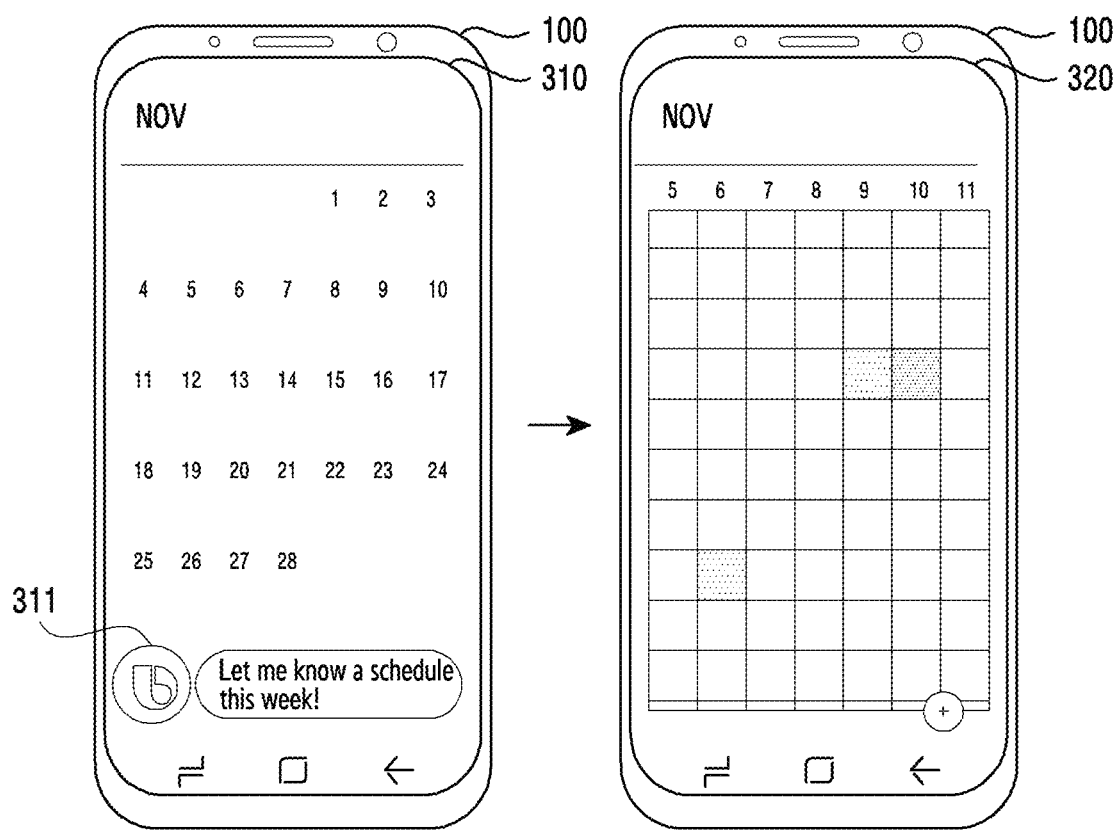
FIG. 3 illustrates a diagram of a screen for processing a voice input received at a user terminal through an intelligent application according to various embodiments.

FIG. 3 illustrates a diagram of a screen for processing a voice input received at a user terminal through an intelligent application according to various embodiments.

The user terminal 100 may execute the intelligent app to process a user input through the intelligent server 200.

According to an embodiment, in a screen 310, if recognizing a designated voice input (e.g., wake up!) or receiving an input through a hardware key (e.g., a dedicated hardware key), the user terminal 100 may execute the intelligent app for processing the voice input. The user terminal 100 may, for example, execute the intelligent app while executing a schedule app. According to an embodiment, the user terminal 100 may display an object (e.g., an icon) 311 corresponding to the intelligent app on the display 140. According to an embodiment, the user terminal 100 may receive a user input by a user utterance. For example, the user terminal 100 may receive a voice input "Let me know a schedule this week!". According to an embodiment, the user terminal 100 may display a user interface (UI) 313 (e.g., an input window) of the intelligent app in which text data of the received voice input is displayed, on the display.

According to an embodiment, in a screen 320, the user terminal 100 may display a result corresponding to the received voice input on the display. For example, the user terminal 100 may receive a plan corresponding to the received user input, and display 'a schedule this week' according to the plan on the display.

Figure 4:
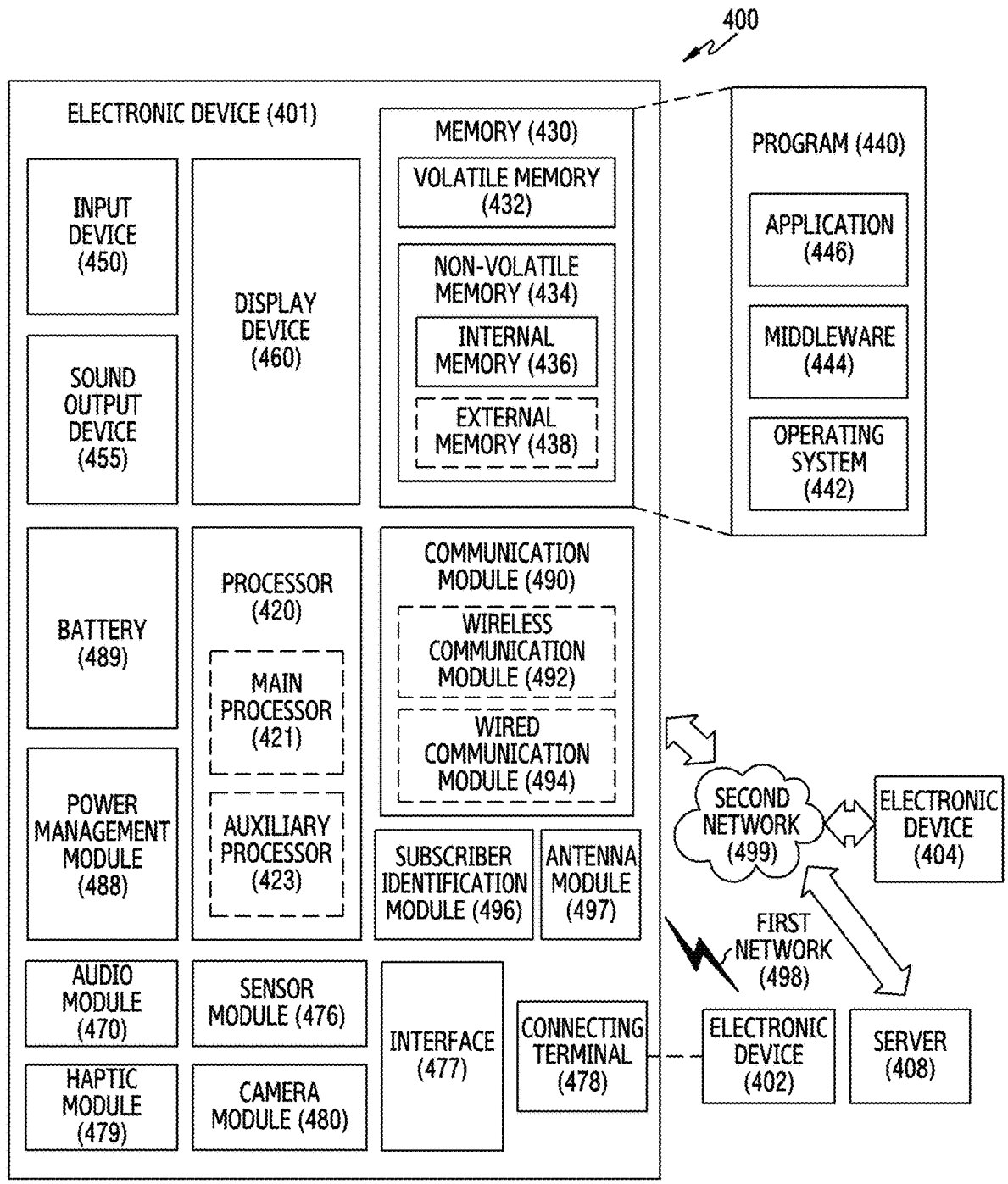
FIG. 4 illustrates a block diagram of an electronic device in a network environment according to various embodiments.

FIG. 4 illustrates a block diagram of an electronic device 401 in a network environment 400 according to various embodiments. Referring to FIG. 4, the electronic device 401 in the network environment 400 may communicate with an electronic device 402 via a first network 498 (e.g., a short-range wireless communication network), or an electronic device 404 or a server 408 via a second network 499 (e.g., a long-range wireless communication network). According to an embodiment, the electronic device 401 may communicate with the electronic device 404 via the server 408. According to an embodiment, the electronic device 401 may include a processor 420, memory 430, an input device 450, a sound output device 455, a display device 460, an audio module 470, a sensor module 476, an interface 477, a haptic module 479, a camera module 480, a power management module 488, a battery 489, a communication module 490, a subscriber identification module (SIM) 496, or an antenna module 497. In some embodiments, at least one (e.g., the display device 460 or the camera module 480) of the components may be omitted from the electronic device 401, or one or more other components may be added in the electronic device 401. In some embodiments, some of the components may be implemented as single integrated circuitry. For example, the sensor module 476 (e.g., a fingerprint sensor, an iris sensor, or an illuminance sensor) may be implemented as embedded in the display device 460 (e.g., a display).

The processor 420 may execute, for example, software (e.g., a program 440) to control at least one other component (e.g., a hardware or software component) of the electronic device 401 coupled with the processor 420, and may perform various data processing or computation. According to one embodiment, as at least part of the data processing or computation, the processor 420 may load a command or data received from another component (e.g., the sensor module 476 or the communication module 490) in volatile memory 432, process the command or the data stored in the volatile memory 432, and store resulting data in non-volatile memory 434. According to an embodiment, the processor 420 may include a main processor 421 (e.g., a central processing unit (CPU) or an application processor (AP)), and an auxiliary processor 423 (e.g., a graphics processing unit (GPU), an image signal processor (ISP), a sensor hub processor, or a communication processor (CP)) that is operable independently from, or in conjunction with, the main processor 421. Additionally or alternatively, the auxiliary processor 423 may be adapted to consume less power than the main processor 421, or to be specific to a specified function. The auxiliary processor 423 may be implemented as separate from, or as part of the main processor 421.

The auxiliary processor 423 may control at least some of functions or states related to at least one component (e.g., the display device 460, the sensor module 476, or the communication module 490) among the components of the electronic device 401, instead of the main processor 421 while the main processor 421 is in an inactive (e.g., sleep) state, or together with the main processor 421 while the main processor 421 is in an active state (e.g., executing an application). According to an embodiment, the auxiliary processor 423 (e.g., an image signal processor or a communication processor) may be implemented as part of another component (e.g., the camera module 480 or the communication module 490) functionally related to the auxiliary processor 423.

The memory 430 may store various data used by at least one component (e.g., the processor 420 or the sensor module 476) of the electronic device 401. The various data may include, for example, software (e.g., the program 440) and input data or output data for a command related thereto. The memory 430 may include the volatile memory 432 or the non-volatile memory 434.

The program 440 may be stored in the memory 430 as software, and may include, for example, an operating system (OS) 442, middleware 444, or an application 446.

The input device 450 may receive a command or data to be used by other component (e.g., the processor 420) of the electronic device 401, from the outside (e.g., a user) of the electronic device 401. The input device 450 may include, for example, a microphone, a mouse, a keyboard, or a digital pen (e.g., a stylus pen).

The sound output device 455 may output sound signals to the outside of the electronic device 401. The sound output device 455 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 460 may visually provide information to the outside (e.g., a user) of the electronic device 401. The display device 460 may include, for example, a display, a hologram device, or a projector and control circuitry to control a corresponding one of the display, hologram device, and projector. According to an embodiment, the display device 460 may include touch circuitry adapted to detect a touch, or sensor circuitry (e.g., a pressure sensor) adapted to measure the intensity of force incurred by the touch.

The audio module 470 may convert a sound into an electrical signal and vice versa. According to an embodiment, the audio module 470 may obtain the sound via the input device 450, or output the sound via the sound output device 455 or a headphone of an external electronic device (e.g., an electronic device 402) directly (e.g., wiredly) or wirelessly coupled with the electronic device 401.

The sensor module 476 may detect an operational state (e.g., power or temperature) of the electronic device 401 or an environmental state (e.g., a state of a user) external to the electronic device 401, and then generate an electrical signal or data value corresponding to the detected state. According to an embodiment, the sensor module 476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 477 may support one or more specified protocols to be used for the electronic device 401 to be coupled with the external electronic device (e.g., the electronic device 402) directly (e.g., wiredly) or wirelessly. According to an embodiment, the interface 477 may include, for example, a high definition multimedia interface (HDMI), a universal serial bus (USB) interface, a secure digital (SD) card interface, or an audio interface.

A connecting terminal 478 may include a connector via which the electronic device 401 may be physically connected with the external electronic device (e.g., the electronic device 402). According to an embodiment, the connecting terminal 478 may include, for example, a HDMI connector, a USB connector, a SD card connector, or an audio connector (e.g., a headphone connector).

The haptic module 479 may convert an electrical signal into a mechanical stimulus (e.g., a vibration or a movement) or electrical stimulus which may be recognized by a user via his tactile sensation or kinesthetic sensation. According to an embodiment, the haptic module 479 may include, for example, a motor, a piezoelectric element, or an electric stimulator.

The camera module 480 may capture a still image or moving images. According to an embodiment, the camera module 480 may include one or more lenses, image sensors, image signal processors, or flashes.

The power management module 488 may manage power supplied to the electronic device 401. According to one embodiment, the power management module 488 may be implemented as at least part of, for example, a power management integrated circuit (PMIC).

The battery 489 may supply power to at least one component of the electronic device 401. According to an embodiment, the battery 489 may include, for example, a primary cell which is not rechargeable, a secondary cell which is rechargeable, or a fuel cell.

The communication module 490 may support establishing a direct (e.g., wired) communication channel or a wireless communication channel between the electronic device 401 and the external electronic device (e.g., the electronic device 402, the electronic device 404, or the server 408) and performing communication via the established communication channel. The communication module 490 may include one or more communication processors that are operable independently from the processor 420 (e.g., the application processor (AP)) and supports a direct (e.g., wired) communication or a wireless communication. According to an embodiment, the communication module 490 may include a wireless communication module 492 (e.g., a cellular communication module, a short-range wireless communication module, or a global navigation satellite system (GNSS) communication module) or a wired communication module 494 (e.g., a local area network (LAN) communication module or a power line communication (PLC) module). A corresponding one of these communication modules may communicate with the external electronic device via the first network 498 (e.g., a short-range communication network, such as BLUETOOTH, wireless-fidelity (Wi-Fi) direct, or infrared data association (IrDA)) or the second network 499 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 492 may identify and authenticate the electronic device 401 in a communication network, such as the first network 498 or the second network 499, using subscriber information (e.g., international mobile subscriber identity (IMSI)) stored in the subscriber identification module 496.

The antenna module 497 may transmit or receive a signal or power to or from the outside (e.g., the external electronic device) of the electronic device 401. According to an embodiment, the antenna module 497 may include an antenna including a radiating element composed of a conductive material or a conductive pattern formed in or on a substrate (e.g., PCB). According to an embodiment, the antenna module 497 may include a plurality of antennas. In such a case, at least one antenna appropriate for a communication scheme used in the communication network, such as the first network 498 or the second network 499, may be selected, for example, by the communication module 490 (e.g., the wireless communication module 492) from the plurality of antennas. The signal or the power may then be transmitted or received between the communication module 490 and the external electronic device via the selected at least one antenna. According to an embodiment, another component (e.g., a radio frequency integrated circuit (RFIC)) other than the radiating element may be additionally formed as part of the antenna module 497.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 401 and the external electronic device 404 via the server 408 coupled with the second network 499. Each of the electronic devices 402 and 404 may be a device of a same type as, or a different type, from the electronic device 401. According to an embodiment, all or some of operations to be executed at the electronic device 401 may be executed at one or more of the external electronic devices 402, 404, or 408. For example, if the electronic device 401 should perform a function or a service automatically, or in response to a request from a user or another device, the electronic device 401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 401. The electronic device 401 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 440) including one or more instructions that are stored in a storage medium (e.g., internal memory 436 or external memory 438) that is readable by a machine (e.g., the electronic device 401). For example, a processor (e.g., the processor 420) of the machine (e.g., the electronic device 401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 5A:
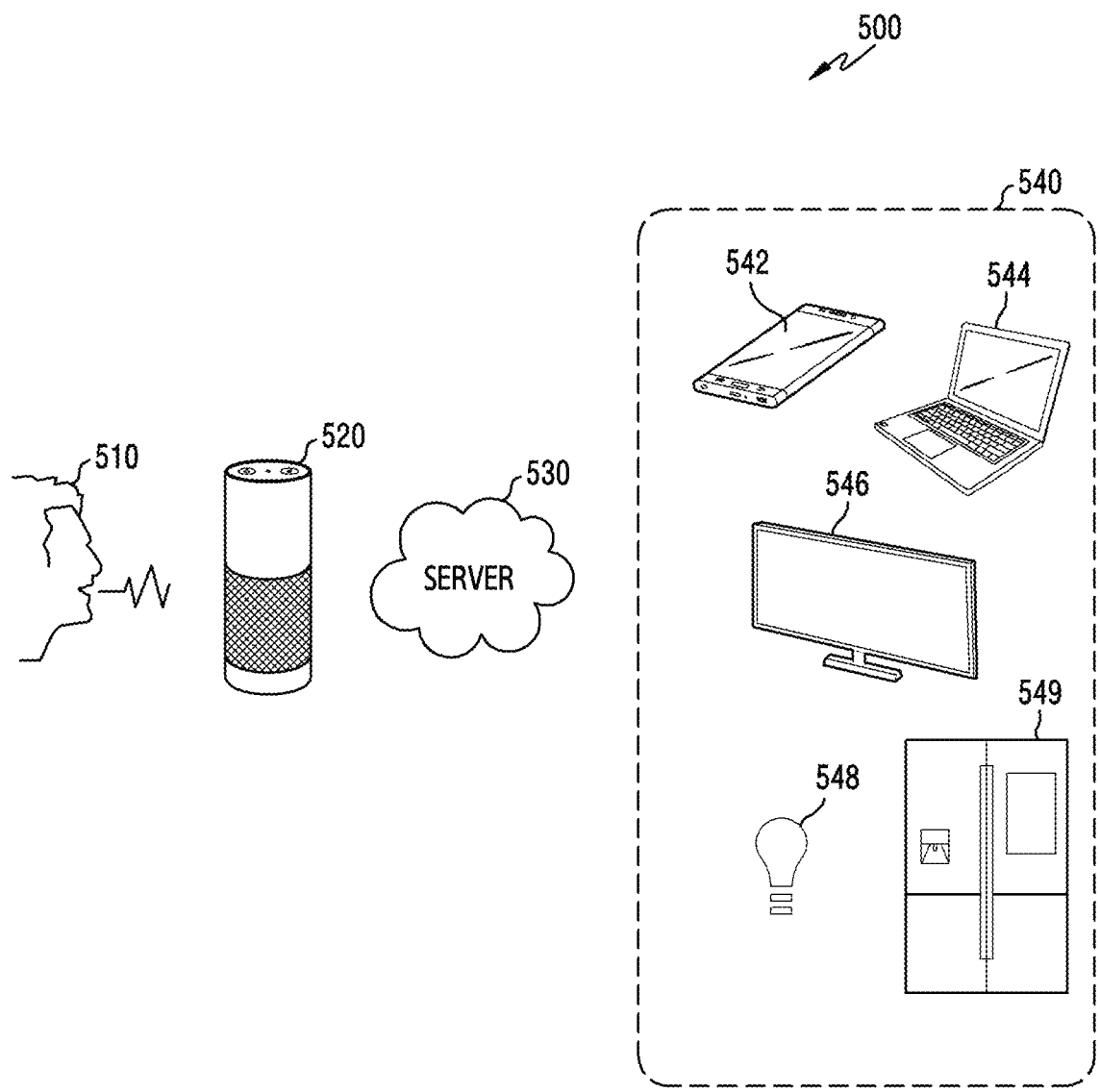
FIG. 5A illustrates a diagram of an example of a remote control system according to various embodiments.

FIG. 5A illustrates a diagram of an example of a remote control system 500 according to various embodiments of the disclosure.

Referring to FIG. 5A, in various embodiments, the remote control system 500 may include an electronic device 520, a server 530, and a plurality of control devices 540.

According to various embodiments, the electronic device 520 may include various devices including a speech recognition configuration and a voice input device (e.g., a microphone). For example, the electronic device 520 may include the electronic device 401 of FIG. 4. The electronic device 520 may obtain an utterance from a user 510 through the voice input device. The utterance may include, but not limited to, an utterance for executing an action using the intelligent assistance. For example, the utterance may include a wake-up utterance for activating and/or invoking the intelligent assistance service and/or a control utterance for operating (e.g., power control, volume control) a hardware/software configuration of the control devices 540. The wake-up utterance may a preset keyword such as "hi", "hello", "hi ABC". For example, ABC may be a name, such as galaxy, given to the electronic device 520 (or a speech recognition agent (or an AI) of the electronic device 520). The control utterance may be obtained while, but not limited to, the intelligent assistance service is activated or invoked by the wake-up utterance. For example, the control utterance may be obtained together with the wake-up utterance.

According to various embodiments, the electronic device 520 may execute an action corresponding to the obtained utterance (or utterance data). According to an embodiment, the electronic device 520 may process the obtained utterance, and perform the action corresponding to the utterance using the electronic device 520 based on the utterance processing result. According to another embodiment, the electronic device 520 may generate a control message (or a control command) based at least in part on the obtained utterance (or utterance data), and transmit the generated control message to a target control device. The control message may be generated based on an utterance data processing result. The utterance data processing may be carried out through the natural language processing by the electronic device 520 and/or the natural language processing by the server 530. For example, the electronic device 520 may autonomously process the utterance data using its speech processing module, to be described in FIG. 5B. In addition, the electronic device 520 may request an utterance data processing result by transmitting the utterance data to the server 530, to be explained in FIG. 5C. For example, the electronic device 520 may include utterance data processing capability of a first level, for example, an ASR module and an NLU module of the first level. The server 530 may include utterance data processing capability of a second level which is higher than the first level, for example, an ASR module and an NLU module of the second level.

According to various embodiments, the control devices 540 may include a smart phone 542, a computer 544 (e.g., a personal computer, a notebook computer, etc.), a television 546, a lighting device 548 or a refrigerator 549. Although not depicted, the control devices 540 according to various embodiments may further include an air conditioner, a thermostat, a security device, a gas valve control device, and a door lock device.

According to an embodiment, the control devices 540 each include a communication circuit, to transmit and receive various information by establishing communication with the server 530, using a designated protocol (e.g., Bluetooth, Wi-Fi, Zigbee, etc.). According to an embodiment, the control devices 540 each may transmit its operation state information (e.g., device on/off information) to the electronic device 520 or the server 530. Also, the control devices 540 may receive a control message (e.g., a device on/off control command, other operation control command of the device, etc.) from the electronic device 520 or the server 530, and thus execute an action corresponding to the control message. Further, the control devices 540 may transmit an execution result of the action corresponding to the control message, to the electronic device 520 or the server 530.

Figure 5B:
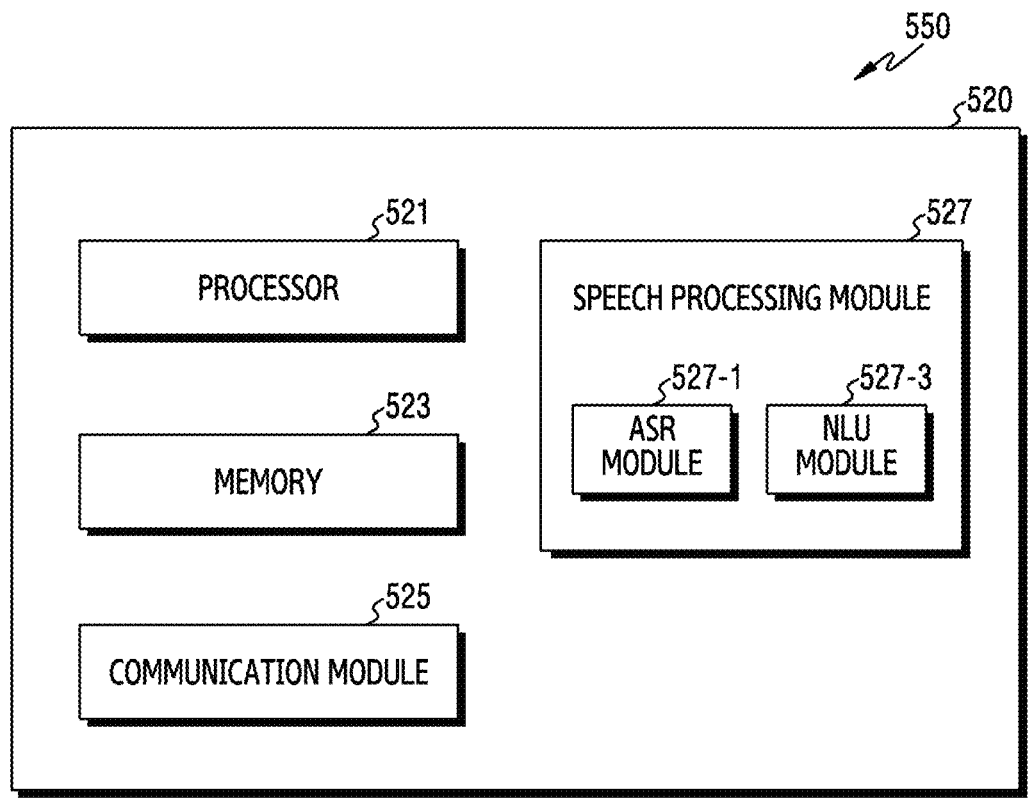
FIG. 5B illustrates s a diagram of a configuration of an electronic device of the remote control system according to various embodiments.
Figure 5C:
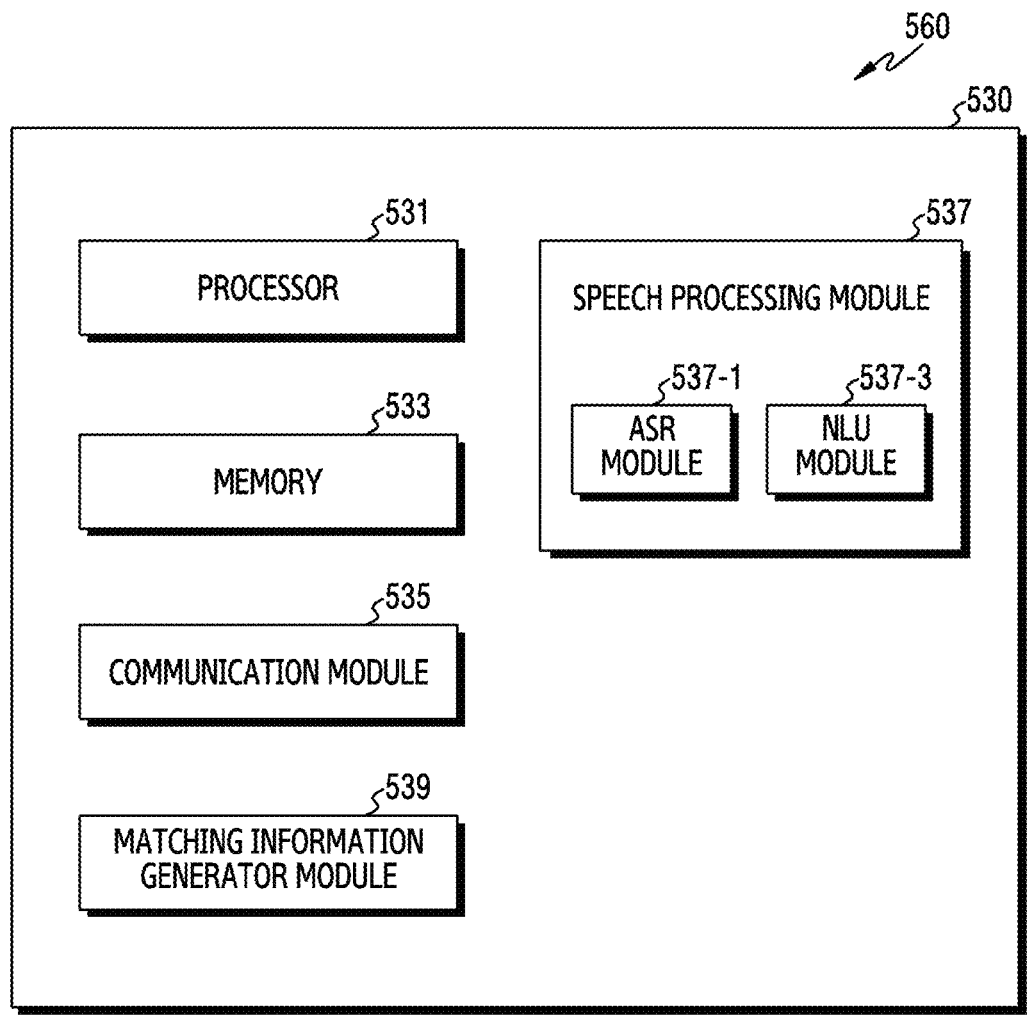
FIG. 5C illustrates a diagram of a configuration of a server of the remote control system according to various embodiments.

FIG. 5B illustrates a diagram 550 of a configuration of the electronic device 520 of the remote control system 500 according to various embodiments of the disclosure. FIG. 5C illustrates a diagram 560 of a configuration of the server 530 of the remote control system 500 according to various embodiments disclosure.

Referring to FIG. 5B, the electronic device 520 may include a processor 521, a memory 523, a communication module 525, and a speech processing module 527.

According to various embodiments, in response to receiving an utterance, the processor 521 may control to process the received utterance through the electronic device 520 and the server 530. According to an embodiment, the processor 521 may control the speech processing module 527 to perform the natural language processing on utterance data received from the user 510. For example, by controlling the speech processing module 527, the processor 521 may acquire at least one of an utterance intent of the user 510, a domain for task execution, and data (e.g., a slot, a task parameter) required to acquire the intent of the user 510. In addition, the processor 521 may provide the received utterance to the server 530 by controlling the communication module 525, to process the received utterance at the server 530.

According to various embodiments, the processor 521 may execute an action corresponding to the utterance (or the utterance data) acquired based on one of a first processing result of the utterance data in the electronic device 520 and a second processing result of the utterance data in the server 530. According to an embodiment, the processor 521 may process to execute the action corresponding to the utterance (or the utterance data) acquired using the electronic device 520 or the control device 540. According to an embodiment, the processor 521 may select the processing result to be used for the action execution, based on prestored intent masking information. The intent masking information may be information in which an utterance processing target is designated for the intent. For example, the processor 521 may identify the intent by processing the received utterance, and based on the intent masking information, determine whether the utterance related to the identified intent is defined to be processed at the electronic device 520 or the server 530.

According to another embodiment, the processor 521 may process to update the prestored intent masking information. According to an embodiment, the processor 521 may control to provide the processing result of the received utterance to the server 530. For example, the processor 521 may transmit to the server 530 the processing result of the utterance data of the electronic device 520 (e.g., the speech processing module 527), and thus receive the intent masking information corresponding to the processing result. In addition, based at least in part on the intent masking information received from the server 530, the processor 521 may process to update the intent masking information prestored in the memory 523.

According to various embodiments, the speech processing module 527 may acquire an intent and/or a domain of the input of the user 510, by performing the natural language processing on the utterance obtained from the user 510. The speech processing module 527 may generate a natural language processing result, by performing the natural language understanding on the input of the user 510. According to an embodiment, the speech processing module 527 may include an ASR module 527-1 and an NLU module 527-3. Although not depicted, the speech processing module 527 may further include an NLG module, a TTS module, and so on.

According to an embodiment, the ASR module 527-1 may generate text data which expresses the received utterance in a designated language. The ASR module 527-1 may generate the text data using an acoustic model and a language model. The acoustic model may include information related to the utterance, and the language model may include unit phoneme information or information relating to a combination of the unit phoneme information. For example, the ASR 527-1 may convert the utterance of the user 510 to the text data by using the utterance information and the unit phoneme information.

According to an embodiment, with respect to the text data generated by the ASR module 527-1, the NLU module 527-3 may acquire the intent or the matching domain of the input of the user 510 using the natural language model, and acquire a component (e.g., a slot, a task parameter) required to express the intent of the user 510. For example, the NLU module 527-3 may process the utterance data, based on the syntactic analysis and the semantic analysis. A domain or an intent corresponding to the utterance is acquired based on the processing result, and the component required to express the intent of the user 510 may be acquired. According to an embodiment, the NLU module 527-3 may include a plurality of NLU modules. The NLU modules may correspond to the control devices 540 respectively. For example, the NLU modules each may acquire the intent or the matching domain of the input of the user 510 by referring to NLU databases corresponding to the control devices 540 (including a smart phone 542, a computer 544, a television 546, a lighting device 548, and an appliance such as a refrigerator 549).

According to an embodiment, the speech processing module 527 (e.g., the NLG module) may generate data occurring in the natural language processing, in the form of the natural language. The data generated in the form of the natural language may be an NLU result. In addition, the NLG module may generate an execution result indicating whether a control operation corresponding to the control utterance is performed by the control device 540, in the form of the natural language.

Referring to FIG. 5C, at least some component of the server 530 may correspond to at least part of the configuration of the electronic device 520. For example, the server 530 may include a processor 531, a memory 533, a communication module 535 and a speech processing module 537, and may further include a matching information generator module 539 additionally or selectively. Accordingly, detailed descriptions on the component of the server 530 corresponding to the component of the electronic device 520 shall be omitted.

According to various embodiments, the processor 531 of the server 530 may control the speech processing module 537 to process the utterance data received from the electronic device 520. In addition, the processor 531 may provide a processing result of the utterance data to the electronic device 520. For example, the processing result may include at least one of the input intent of the user 510, the domain for the task execution, and the data (e.g., a slot, a task parameter) required to acquire the intent of the user 510.

According to various embodiments, the processor 531 of the server 530 may control to provide the intent masking information to the electronic device 520, as part of the processing result. As mentioned above, the intent masking information may be the information designating the utterance processing target for the intent. The intent masking information may be generated by the matching information generator module 539, to be explained.

According to various embodiments, the speech processing module 537 of the server 530 may include an ASR module 537-1 and an NLU module 537-3, similarly to the speech processing module 527 of the electronic device 520. According to an embodiment, the speech processing module 537 of the server 530 may have higher processing capability than the utterance data processing capability of the electronic device 520. For example, the utterance (or utterance data) processing result of the speech processing module 537 of the server 530 may exhibit higher accuracy than the utterance processing result of the speech processing module 527 of the electronic device 520.

According to various embodiments, the matching information generator module 539 of the server 530 may generate intent masking information based on the processing result of the electronic device 520 (e.g., the speech processing module 527). The intent masking information may be associated with a matching ratio between a first processing result of the utterance data by the electronic device 520 (e.g., the speech processing module 527) and a second processing result of the utterance data by the server 530 (e.g., the speech processing module 537). According to an embodiment, the server 530 may receive the first processing result from the electronic device 520, and the speech processing module 537 may identify the matching ratio with respect to the first processing result by comparing the received first processing result and the second processing result of the server 530. Based on the matching ratio, the speech processing module 537 may generate the intent masking information which designates one of the electronic device 520 or the server 530 as the processing target of the received utterance. For example, with respect to the intent of the utterance data, the speech processing module 537 may generate the intent masking information based on the number of the utterance data processing using the electronic device 520 and the number of the times for matching the utterance data processing result of the electronic device 520 and the utterance data processing result of the server 530, to be described in FIG. 12.

According to various embodiments, an electronic device (e.g., the electronic device 520, the electronic device 401) may include at least one communication circuit (e.g., the communication circuit 490, the communication module 525), at least one microphone (e.g., the input device 450), at least one processor (e.g., the processor 420, the processor 521) operatively connected to the at least one communication circuit and the at least one microphone, and at least one memory (e.g., the memory 430, the memory 523) operatively connected to the at least one processor. According to an embodiment, the at least one memory may store instructions, when executed, causing the at least one processor to store intent masking information which defines an utterance processing target for at least one intent, in the memory, and if receiving an utterance indicating a speech based intelligent assistance service through the at least one microphone, determine one of the electronic device or a server connected through the at least one communication circuit to a processing target of the received utterance, based on the intent masking information.

According to various embodiments, the instructions may cause the at least one processor to transmit the received utterance and a processing result of the utterance to the server through the at least one communication circuit, and receive from the server the intent masking information of the processing result through the at least one communication circuit.

According to various embodiments, the instructions may cause the at least one processor to, in response to receiving the utterance, process the received utterance through the electronic device and the server, and if the utterance processing target is determined to the electronic device while processing the utterance through the electronic device and the server, direct the server to abort the utterance processing, through the at least one communication circuit.

According to various embodiments, the instructions may cause the at least one processor to, if the utterance processing target is determined to the server, abort the utterance processing using the electronic device, and receive an utterance processing result from the server.

According to various embodiments, the instructions may cause the at least one processor to process at least one action, based at least in part on an utterance processing result by the determined utterance processing target.

According to various embodiments, the electronic device may further include a display device (e.g., the display device 460), wherein the instructions may cause the at least one processor to output the stored intent masking information through the display device, and change a designated utterance processing target in the stored intent masking information, based on an input for the outputted intent masking information.

According to various embodiments, the electronic device may include utterance processing capability of a first level, and the server may include processing capability of a second level which is higher than the first level.

According to various embodiments, a server (e.g., the server 530, the intelligent server 200) for supporting a speech based intelligent assistance service may include at least one communication circuit (e.g., the communication module 535), at least one microphone, at least one processor (e.g., the processor 531) operatively connected to the at least one communication circuit and the at least one microphone, and at least one memory (e.g., the memory 533) operatively connected to the at least one processor. According to an embodiment, the at least one memory may store instructions, when executed, causing the at least one processor to receive an utterance and a first processing result of the utterance from an electronic device (e.g., the electronic device 520), through the at least one communication circuit, acquire a second processing result by processing the received utterance, generate intent masking information which defines an utterance processing target for at least one intent, based on the first processing result and the second processing result, and provide the generated intent masking information to the electronic device, through the at least one communication circuit.

According to various embodiments, the instructions may cause the at least one processor to transmit the second result with the intent masking information to the server.

According to various embodiments, the instructions may cause the at least one processor to generate the intent masking information based on a matching ratio of the first processing result and the second processing result.

According to various embodiments, the first processing result may be a result processed by utterance processing capability of a first level, and the instructions may cause the at least one processor to acquire the second processing result through utterance processing capability of a second level which is higher than the first level.

According to various embodiments, the instructions may cause the at least one processor to, if the electronic device directs to abort the utterance processing, abort the processing of the received utterance.

Figure 6:
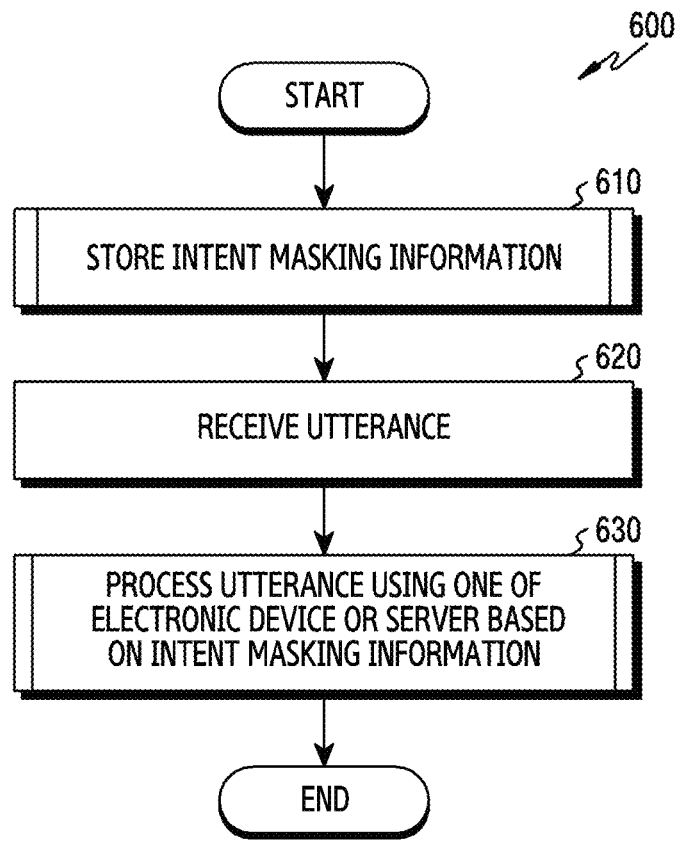
FIG. 6 illustrates a flowchart for providing an intelligent assistance service in an electronic device according to various embodiments.

FIG. 6 illustrates a flowchart 600 for providing an intelligent assistance service in an electronic device 520 according to various embodiments of the disclosure. Operations may be sequentially performed in this embodiment, but not necessarily. For example, the sequence of the operations may be changed, and at least two operations may be conducted in parallel.

Referring to FIG. 6, according to various embodiments, the electronic device 520 (e.g., the processor 521 of FIG. 5B) may store intent masking information in operation 610. The intent masking information may information for designating the utterance processing target for the intent. For example, the intent masking information may be information defined to process the utterance processing related to at least one intent through the electronic device 520 or the server 530.

According to various embodiments, the electronic device 520 (e.g., the processor 521 of FIG. 5B) may receive (or obtain) an utterance from the user 510 through an input device (e.g., a microphone), in operation 620. The utterance may include, as mentioned earlier, a wake-up utterance for activating and/or invoking the intelligent assistance service, a control utterance for operating (e.g., power control, volume control) a hardware/software configuration of the control devices 540, and/or an utterance for performing an action related to the electronic device 520 using the intelligent assistance. According to an embodiment, the utterance may be received if the electronic device 520 operates in a low power mode. The low power mode may, but not limited to, activate a first processor (e.g., the auxiliary processor 423 of FIG. 4) for receiving the wake-up utterance, and deactivate a second processor (e.g., the main processor 421 of FIG. 4) for controlling the intelligent assistance service. For example, the utterance may be received while both of the first processor and the second processor are activated.

According to various embodiments, the electronic device 520 (e.g., the processor 521 of FIG. 5B) may determine one of the electronic device 520 or the server 530 as the utterance processing target, based on the intent masking information, in operation 630. According to an embodiment, the processor 521 may identify an intent for the received utterance. Based on the stored intent masking information, the processor 521 may determine whether the identified intent processing target is the electronic device 520 or the server 530. For example, the processor 521 may process the received utterance using the determined processing target. For example, the processor 521 may provide a service based on an utterance processing result of the determined processing target.

Figure 7:
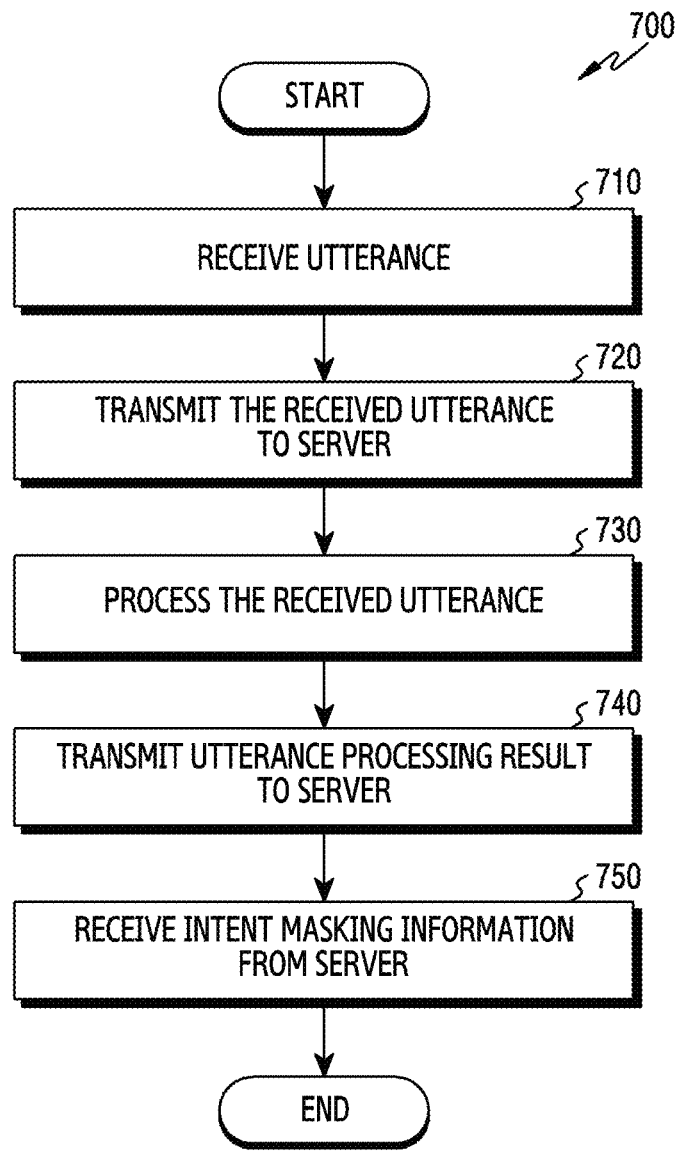
FIG. 7 illustrates a flowchart for storing intent masking information in an electronic device according to various embodiments.

FIG. 7 illustrates a flowchart 700 for storing intent masking information in an electronic device 520 according to various embodiments of the disclosure. Operations of FIG. 7 may represent various embodiments of operation 610 of FIG. 6. Operations may be sequentially performed in this embodiment, but not necessarily. For example, the sequence of the operations may be changed, and at least two operations may be performed in parallel.

Referring to FIG. 7, according to various embodiments, the electronic device 520 (e.g., the processor 521 of FIG. 5B) may receive (or obtain) an utterance from the user 510 through an input device (e.g., a microphone), in operation 710. The utterance may include, as mentioned earlier, the wake-up utterance for activating and/or invoking the intelligent assistance service, the control utterance for operating (e.g., power control, volume control) the hardware/software configuration of the control devices 540, and/or the utterance for executing the action related to the electronic device 520 using the intelligent assistance.

According to various embodiments, the electronic device 520 (e.g., the processor 521 of FIG. 5B) may transmit the received utterance to the server 530 in operation 720. According to an embodiment, the processor 521 may transmit the received utterance to the server 530 to process the received utterance at the server 530. For example, the server 530 may process the received utterance through the speech processing module 537 having the higher processing capability than the speech processing module 527 of the electronic device 520.

According to various embodiments, the electronic device 520 (e.g., the processor 521 of FIG. 5B) may process the received utterance in operation 730. According to an embodiment, the processor 521 may identify intent information for the received utterance. The intent information may be an utterance processing result by the electronic device 520. According to an embodiment, the processor 521 may obtain the intent information by controlling the speech processing module 527 of the electronic device 520.

According to various embodiments, the electronic device 520 (e.g., the processor 521 of FIG. 5B) may transmit the utterance processing result to the server 530 in operation 740. For example, the processor 521 may transmit the intent information of the utterance identified by the electronic device 520, as the utterance processing result, to the server 530.

According to various embodiments, the electronic device 520 (e.g., the processor 521 of FIG. 5B) may receive the intent masking information from the server 530 in operation 750. According to an embodiment, the processor 521 may receive the intent masking information of the designated processing target for the at least one intent. In addition, the processor 521 may store the received intent masking information in the electronic device 520 (e.g., the memory 523), and determine the processing target of the received utterance to one of the electronic device 520 or the server 530.

It has been described that, but not limited to, the electronic device 520 transmits the utterance to the server 530 and then receives the intent masking information from the server 530 in the above-stated embodiment. For example, the electronic device 520 may receive predefined intent masking information from the server 530 before transmitting the utterance to the server 530.

Figure 8:
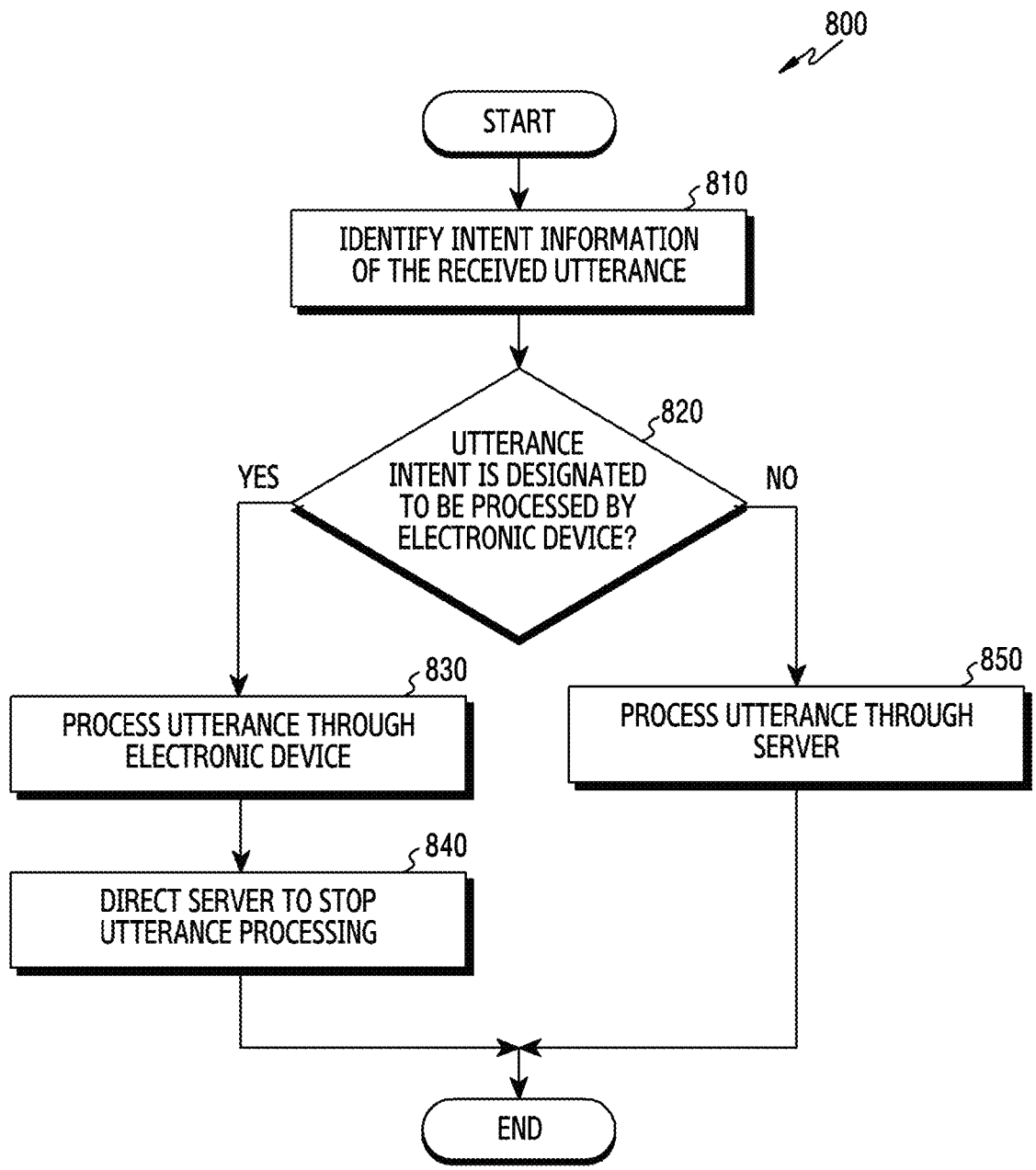
FIG. 8 illustrates a flowchart for processing a received utterance in an electronic device according to various embodiments.

FIG. 8 illustrates a flowchart 800 for processing a received utterance in an electronic device 520 according to various embodiments. Operations of FIG. 8 may represent various embodiments of operation 630 of FIG. 6. Operations may be sequentially performed in this embodiment, but not necessarily. For example, the sequence of the operations may be changed, and at least two operations may be performed in parallel.

Referring to FIG. 8, according to various embodiments, the electronic device 520 (e.g., the processor 521 of FIG. 5B) may identify intent information for the received utterance, in operation 810. According to an embodiment, the processor 521 may identify the intent information using the speech processing module 527 of the electronic device 520.

According to various embodiments, the electronic device 520 (e.g., the processor 521 of FIG. 5B) may identify a processing target for the intent of the received utterance in operation 820. According to an embodiment, based on intent masking information stored, the processor 521 may determine whether the processing target of the received utterance is designated to the electronic device 520 or the server 530.

According to various embodiments, if identifying that the processing target of the received utterance is designated to the electronic device 520, the electronic device 520 (e.g., the processor 521 of FIG. 5B) may process the utterance through the electronic device 520 in operation 830. According to an embodiment, based on the utterance processing result by the speech processing module 527 of the electronic device 520, the processor 521 may perform an action (or an operation) for controlling the electronic device 520 or at least one control device 540. For example, the processor 521 may use at least one of the intent for the input of the user 510, the domain for the task execution, and the data (e.g., a slot, a task parameter) required to acquire the intent of the user 510, which are acquired through the processing capability of the first level, for the action execution. According to various embodiments, the electronic device 520 (e.g., the processor 521 of FIG. 5B) may direct the server 530 to stop the utterance processing in operation 840. According to an embodiment, the processor 521 may direct the server 530 to stop the utterance processing, in response to identifying that the processing target of the received utterance is designated to the electronic device 520.

According to various embodiments, if identifying that the processing target of the received utterance is designated to the server 530, the electronic device 520 (e.g., the processor 521 of FIG. 5B) may process the utterance through the server 530 in operation 850. According to an embodiment, based on the utterance processing result by the speech processing module 537 of the server 530, the processor 521 may execute an action for controlling the electronic device 520 or at least one control device 540. For example, the processor 521 may use at least one of the intent for the input of the user 510, the domain for the task execution, and the data required to acquire the intent of the user 510, which are acquired through the processing capability of the second level, for the action execution.

Figure 9:
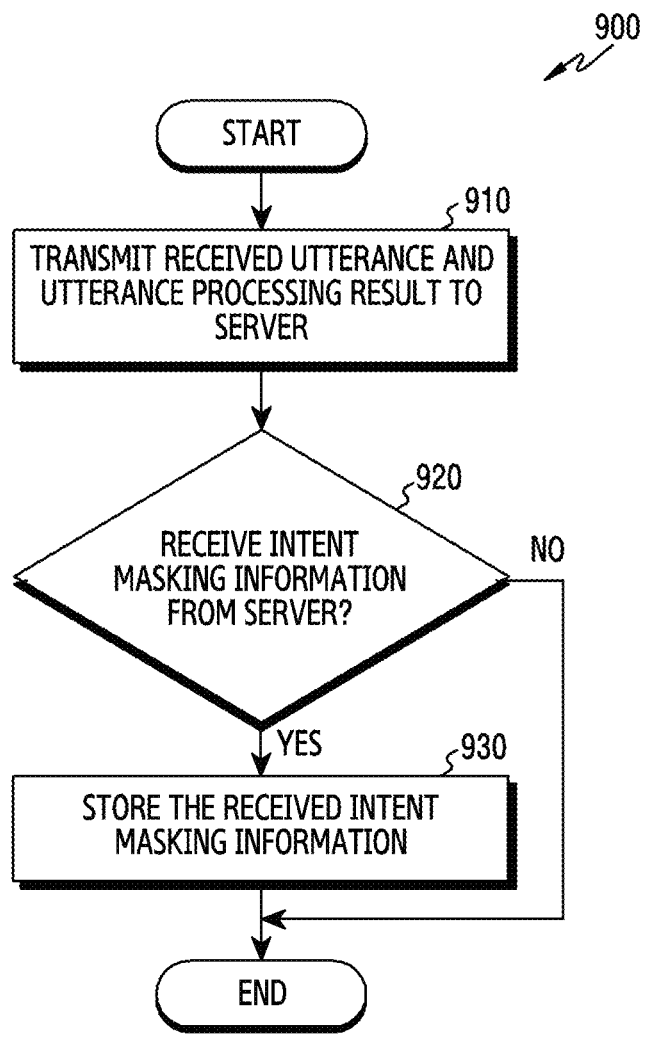
FIG. 9 illustrates a flowchart for processing a received utterance in an electronic device according to various embodiments.

FIG. 9 illustrates a flowchart 900 for processing a received utterance in an electronic device 520 according to various embodiments of the disclosure. Operations of FIG. 9 may represent various embodiments of operation 630 of FIG. 6. Operations may be sequentially performed in this embodiment, but not necessarily. For example, the sequence of the operations may be changed, and at least two operations may be performed in parallel.

Referring to FIG. 9, according to various embodiments, the electronic device 520 (e.g., the processor 521 of FIG. 5B) may transmit the received utterance and an utterance processing result to the server 530 in operation 910. As described above, the server 530 may have the higher processing capability than the utterance data processing capability of the electronic device 520. According to an embodiment, the processor 521 may obtain intent information of the received utterance by controlling the speech processing module 527 of the electronic device 520. The processor 521 may transmit the intent information as the processing result. Thus, the server 530 may process the received utterance, compare the processing result with the processing result of the electronic device 520, and thus generate intent masking information, to be explained in FIG. 12.

According to various embodiments, the electronic device 520 (e.g., the processor 521 of FIG. 5B) may determine whether the intent masking information is received from the server 530, in operation 920. The intent masking information may be the information of the utterance processing target designated for the intent, as stated earlier.

According to various embodiments, if not receiving the intent masking information from the server 530, the electronic device 520 (e.g., the processor 521 of FIG. 5B) may process the received utterance by determining one of the electronic device 520 or the server 530 as the utterance processing target. According to an embodiment, the processor 521 may determine one of the electronic device 520 or the server 530 as the utterance processing target, based on intent masking information stored in the electronic device 520.

Figure 10:
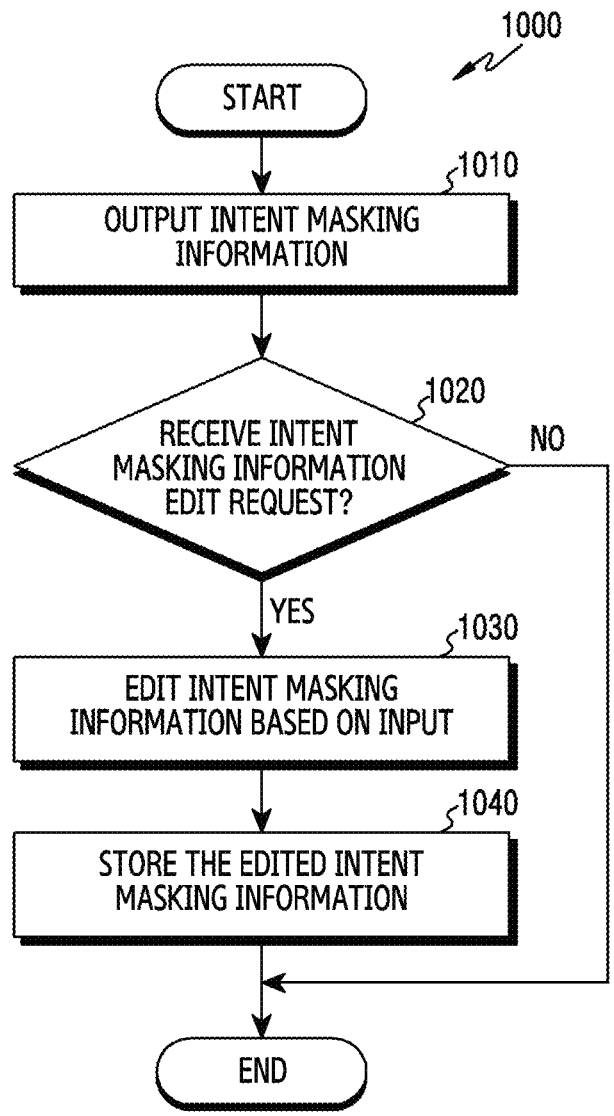
FIG. 10 illustrates a flowchart for editing intent masking information in an electronic device according to various embodiments.
Figure 11:
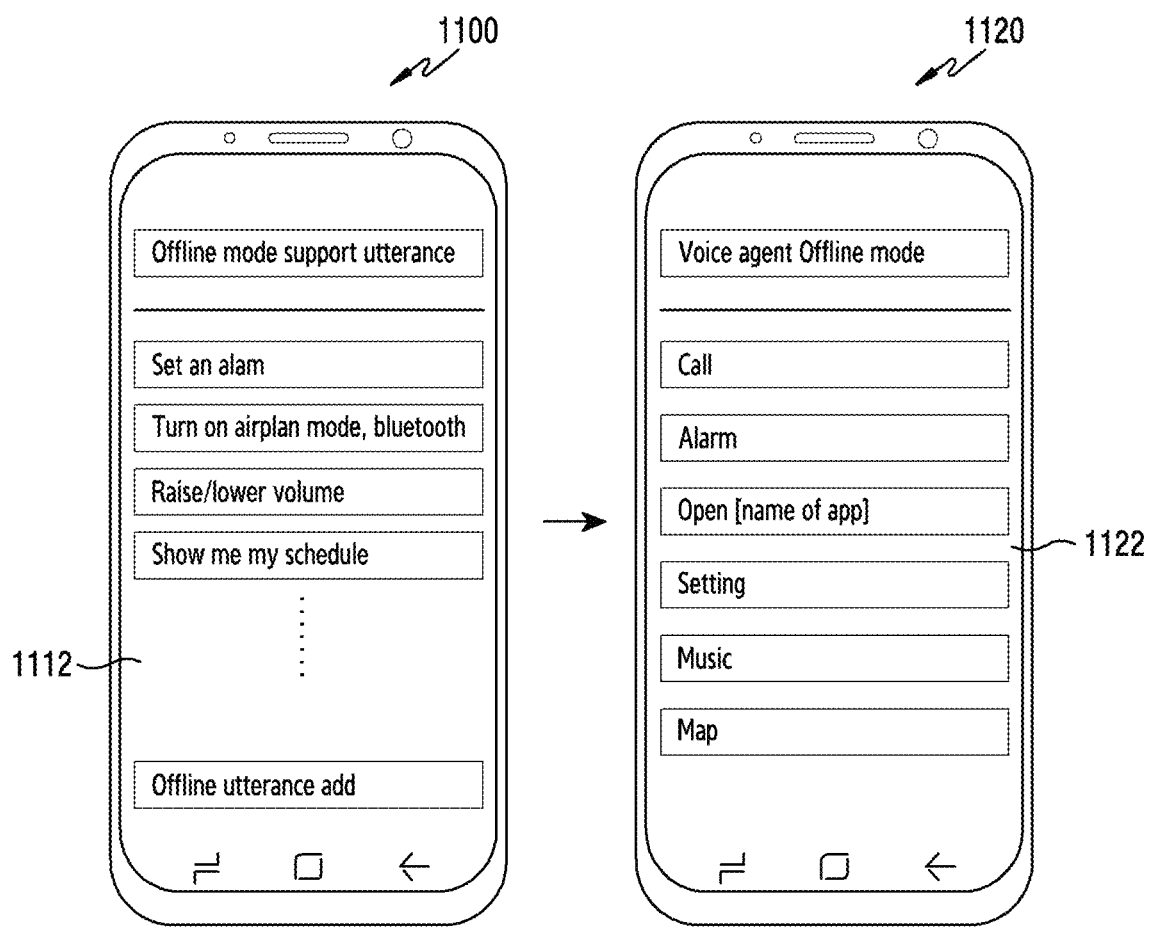
FIG. 11 illustrates a diagram for editing intent masking information according to various embodiments.

According to various embodiments, if receiving the intent masking information from the server 530, the electronic device 520 (e.g., the processor 521 of FIG. 5B) may store the received intent masking information in operation 930. According to an embodiment, the processor 521 may update the intent masking information stored in the electronic device 520 using the received intent masking information. The processor 521 may determine one of the electronic device 520 or the server 530 as the utterance processing target, based on the updated intent masking information FIG. 10 illustrates a flowchart 1000 for editing intent masking information in an electronic device 520 according to various embodiments of the disclosure. FIG. 11 illustrates a diagram for editing intent masking information according to various embodiments of the disclosure. Operations of FIG. 10 may represent various embodiments for at least one of operation 610 through operation 630 of FIG. 6. Operations may be sequentially performed in this embodiment, but not necessarily. For example, the sequence of the operations may be changed, and at least two operations may be performed in parallel.

Referring to FIG. 10, according to various embodiments, the electronic device 520 (e.g., the processor 521 of FIG. 5B) may output intent masking information in operation 1010. According to an embodiment, the processor 521 may input the intent masking information for at least one intent stored in the electronic device 520, through a display (e.g., the display device 460). For example, the processor 521 may provide, but not limited to, a list 1112 of utterances (or intents) processed by the electronic device 520, as shown in a screen 1100 of FIG. 11. For example, the processor 521 may provide an utterance or intent list processed by the server 530.

According to various embodiments, the electronic device 520 (e.g., the processor 521 of FIG. 5B) may determine whether an edit request for the intent masking information is received, in operation 1020. According to an embodiment, editing the intent masking information may indicate that the user directly defines the processing target for the intent of the utterance. For example, the processor 521 may receive a user input which selects an edit target from the utterance or intent list.

According to various embodiments, if not receiving the edit request for the intent masking information, the electronic device 520 (e.g., the processor 521 of FIG. 5B) may determine the processing target for the received utterance, based on intent masking information stored in the electronic device 520, and process the utterance with the determined processing target.

According to various embodiments, if receiving the edit request for the intent masking information, the electronic device 520 (e.g., the processor 521 of FIG. 5B) may edit the intent masking information based on the input, in operation 1030. According to an embodiment, with respect to the utterance or the intent selected by the user input, the processor 521 may edit the intent masking information to be conducted only by the electronic device 520 and the server 530 designated by the user. For example, as mentioned above, the utterance data processing scheme may include the first processing scheme which processes the utterance data at the electronic device 520 and the second processing scheme which processes the utterance data at the server 530, and the processor 521 may manage utterances lists processable in the processing schemes respectively. In so doing, the processor 521 may the utterance designated by the user input to be processed by the electronic device 520, to a first utterance list 1122, as shown in a screen 1120 of FIG. 11. Although not depicted, if the user input designates to process the utterance at the server 530, the processor 521 may add the designated utterance to the second utterance list.

According to various embodiments, the electronic device 520 (e.g., the processor 521 of FIG. 5B) may store the edited intent masking information in operation 1040. According to an embodiment, the processor 521 may process the received utterance, based on the edited intent masking information. For example, the processor 521 may identify the intent of the received utterance, and process the utterance by determining one of the electronic device 520 or the server 530 as the processing target of the identified intent, based on the edited intent masking information.

Figure 12:
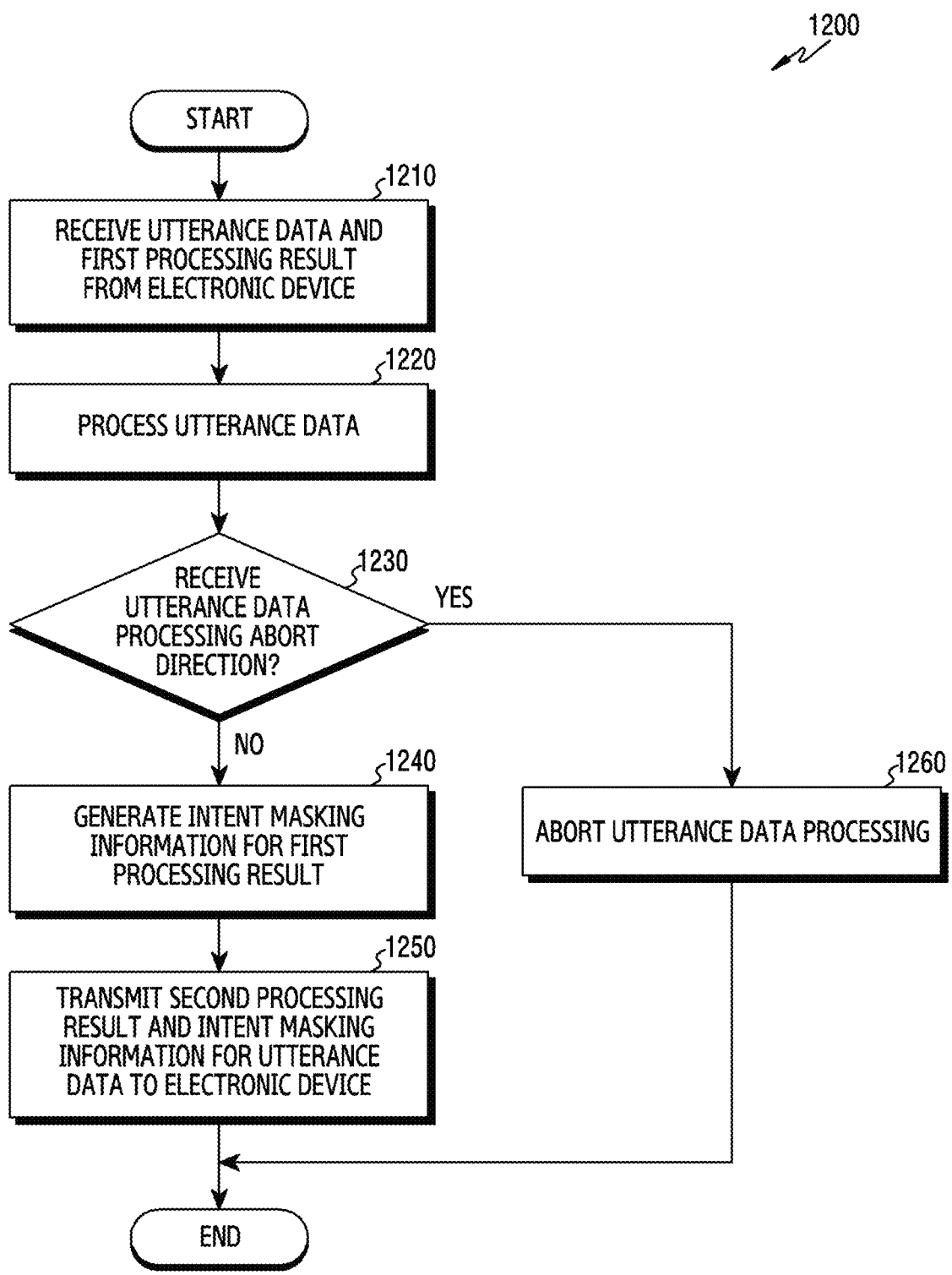
FIG. 12 illustrates a flowchart for providing an intelligent assistance service in a server according to various embodiments.

FIG. 12 illustrates a flowchart 1200 for providing an intelligent assistance service in a server 530 according to various embodiments of the disclosure. Operations may be sequentially performed in this embodiment, but not necessarily. For example, the sequence of the operations may be changed, and at least two operations may be performed in parallel.

Referring to FIG. 12, according to various embodiments, the server 530 (e.g., the processor 531 of FIG. 5C) may receive utterance data and a first processing result from the electronic device 520 in operation 1210. According to an embodiment, the first processing result may be the utterance data processing result by the electronic device 520 having the first processing capability.

According to various embodiments, the server 530 (e.g., the processor 531 of FIG. 5C) may process the utterance data received from the electronic device 520, in operation 1220. According to an embodiment, by processing the utterance data, the processor 531 may acquire a second processing result including at least one of the input intent of the user 510, the domain for the task execution, and the data (e.g., a slot, a task parameter) required to acquire the intent of the user 510. For example, the processor 531 may process the utterance data using the speech processing module 537 (e.g., the ASR module 537-1, the NLU module 537-3, etc.) having the second processing capability which is higher than the processing capability of the electronic device 520.

According to various embodiments, the server 530 (e.g., the processor 531 of FIG. 5C) may determine whether an utterance data processing abort direction is received from the electronic device 520, in operation 1230.

According to various embodiments, if receiving the utterance data processing abort direction, the server 530 (e.g., the processor 531 of FIG. 5C) may abort the utterance data processing in operation 1260.

According to various embodiments, if not receiving the utterance data processing abort direction, the server 530 (e.g., the processor 531 of FIG. 5C) may generate intent masking information for the first processing result in operation 1240. The intent masking information may be the information for designating the utterance processing target for the intent, as mentioned earlier. According to an embodiment, the processor 531 may process the received utterance data using the speech processing module 537 of the server 530, and thus acquire the second processing result. The processor 531 may determine the processing target for the received utterance data, based on the matching ratio of the first processing result obtained from the electronic device 520 and the second processing result obtained from the server 530. For example, the processor 531 may determine the processing target for the utterance data based on Equation 1.

$$\text{Target} = \begin{pmatrix} \text{Device, when} \frac{M^i}{T^i} > \theta \\ \text{Server, otherwise} \end{pmatrix} \quad (1)$$

In Equation 1, T may denote the number of the utterance data processing using the electronic device 520, and M may denote the number of times for matching the first processing result of the utterance data by the electronic device 520 and the second processing result of the utterance data by the server 530. M/T may represent the matching ratio of the first processing result acquired by the electronic device 520 to the second processing result acquired by the server 530.

According to an embodiment, the processor 531 may determine the electronic device 520 as the utterance processing target if the matching ratio of the received first processing result is greater than a threshold θ, and determine the server 530 as the utterance processing target if the matching ratio of the received first processing result is smaller than the threshold θ. For example, the processor 531 may generate the intent masking information which defines the processing target for the utterance data as shown in Table 1.

TABLE 1

| Intent of utterance data | The number of a trial | The number of matching | Processing target |
|---|---|---|---|
| Phone. call | 344799 | 344550 | Device |
| Gallery. Search | 459000 | 356900 | Server |
| Camera. filter | 790011 | 12424 | Server |
| . . . | . . . | . . . | . . . |

According to various embodiments, the server 530 (e.g., the processor 531 of FIG. 5C) may transmit the second processing result and/or the intent masking information in operation 1250. According to an embodiment, the processor 531 may provide the intent masking information of Table 1 to the electronic device 520.

In the above embodiment, it has been explained that, but not limited to, the server 530 generates the intent masking information. For example, in response to receiving the utterance data, the server 530 may provide the matching ratio of the received utterance data to the electronic device 520, and the electronic device 520 may determine the utterance data processing target based on the received matching ratio.

According to various embodiments, an operating method of an electronic device (e.g., the electronic device 520) may include storing intent masking information which defines an utterance processing target for at least one intent, and if receiving an utterance indicating a speech based intelligent assistance service, determining one of the electronic device or a server which establishes communication with the electronic device, to a processing target of the received utterance, based on the intent masking information.

According to various embodiments, storing the intent masking information may include transmitting the received utterance and a processing result of the utterance to the server, and receiving the intent masking information of the processing result from the server.

According to various embodiments, determining the processing target of the received utterance may include processing the received utterance through the electronic device and the server, and if determining the utterance processing target to the electronic device while processing the utterance through the electronic device and the server, directing the server to abort the utterance processing.

According to various embodiments, determining the processing target of the received utterance may include, if determining the utterance processing target to the server, aborting the utterance processing using the electronic device, and receiving an utterance processing result from the server.

According to various embodiments, determining the processing target of the received utterance may include processing at least one action, based at least in part on an utterance processing result by the determined utterance processing target.

According to various embodiments, the method may further include outputting the stored intent masking information, and changing a designated utterance processing target in the stored intent masking information, based on an input for the outputted intent masking information.

According to various embodiments, the electronic device may include utterance processing capability of a first level, and the server may include processing capability of a second level which is higher than the first level.

An electronic device according to various embodiments of the disclosure may determine one of the electronic device and the server as the processing target of the received utterance, based on intent masking information which defines the utterance processing target for the intent, and thus improve performance of the intelligent assistance service.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   at least one communication circuit;
   at least one microphone;
   at least one processor operatively connected to the at least one communication circuit and the at least one microphone; and
   at least one memory operatively connected to the at least one processor,
   wherein the at least one memory is configured to store instructions, and
   wherein the at least one processor is configured to:
      store intent masking information that defines an utterance processing target for at least one intent, in the memory, the utterance processing target comprises one of the electronic device or a server connected through the at least one communication circuit, which is determined at least based on whether a first processing result of at least one utterance processed by the electronic device is matched with a second processing result of the at least one utterance processed by the server, and
      when an utterance indicating a speech based intelligent assistance service through the at least one microphone is received, determine that a processing target of the received utterance is one of the electronic device or the server, based on the intent masking information and an intent identified from the received utterance, and
   wherein the at least one utterance corresponds to the at least one intent respectively.

2. The electronic device of claim 1, wherein the at least one processor is further configured to:
   transmit the received utterance and a processing result of the utterance to the server through the at least one communication circuit, and
   receive, from the server, the intent masking information generated or updated at least based on the processing result through the at least one communication circuit.

3. The electronic device of claim 1, wherein the at least one processor is further configured to:
   in response to receiving the utterance, process the received utterance through the electronic device and the server, and
   in response to a determination that the utterance processing target is the electronic device, while processing the utterance through the electronic device and the server, direct the server to abort the utterance processing, through the at least one communication circuit.

4. The electronic device of claim 3, wherein the at least one processor is further configured to:
   in response to a determination that the utterance processing target is the server, abort the utterance processing using the electronic device, and
   receive an utterance processing result from the server.

5. The electronic device of claim 1, wherein the at least one processor is further configured to:
   process at least one action, based at least in part on an utterance processing result by the determined processing target.

6. The electronic device of claim 1, further comprising a display device,
   wherein the at least one processor is further configured to:
   output the stored intent masking information through the display device, and
   change a designated utterance processing target in the stored intent masking information, based on an input for the outputted intent masking information.

7. The electronic device of claim 1, wherein:
   the electronic device comprises utterance processing capability of a first level, and
   the server comprises processing capability of a second level that is higher than the first level.

8. A method for operating an electronic device, the method comprising:
   storing intent masking information that defines an utterance processing target for at least one intent, the utterance processing target comprises one of the electronic device or a server, which is determined at least based on whether a first processing result of at least one utterance processed by the electronic device is matched with a second processing result of the at least one utterance processed by the server; and
   when an utterance indicating a speech based intelligent assistance service is received, determining that a processing target of the received utterance is one of the electronic device or the server that establishes communication with the electronic device, based on the intent masking information, and an intent identified from the received utterance,
   wherein the at least one utterance corresponds to the at least one intent respectively.

9. The method of claim 8, wherein storing the intent masking information comprises:
   transmitting the received utterance and a processing result of the utterance to the server; and
   receiving the intent masking information generated or updated at least based on the processing result from the server.

10. The method of claim 8, wherein determining the processing target of the received utterance comprises:
    processing the received utterance through the electronic device and the server; and
    in response to determining that the utterance processing target is the electronic device, while processing the utterance through the electronic device and the server, directing the server to abort the utterance processing.

11. The method of claim 10, wherein determining the processing target of the received utterance comprises:
    in response to determining that the utterance processing target is the server, aborting the utterance processing using the electronic device, and
    receiving an utterance processing result from the server.

12. The method of claim 8, wherein determining the processing target of the received utterance comprises:
    processing at least one action, based at least in part on an utterance processing result by the determined processing target.

13. The method of claim 8, further comprising:
    outputting the stored intent masking information; and
    changing a designated utterance processing target in the stored intent masking information, based on an input for the outputted intent masking information.

14. The method of claim 8, wherein:
    the electronic device comprises utterance processing capability of a first level, and
    the server comprises processing capability of a second level that is higher than the first level.

15. A server for supporting a speech based intelligent assistance service, comprising:
    at least one communication circuit;
    at least one processor operatively connected to the at least one communication circuit; and
    at least one memory operatively connected to the at least one processor,
    wherein the at least one memory is configured to store instructions, and
    wherein the at least one processor is configured to:
    receive an utterance and a first processing result of the utterance from an electronic device, through the at least one communication circuit,
    acquire a second processing result by processing the received utterance,
    generate intent masking information that defines an utterance processing target for at least one intent, based on whether the first processing result is matched with the second processing result, and
    provide the generated intent masking information to the electronic device, through the at least one communication circuit.

16. The server of claim 15, wherein the at least one processor is configured to transmit the second processing result with the intent masking information to the server.

17. The server of claim 15, wherein the at least one processor is configured to generate the intent masking information based on a matching ratio of the first processing result and the second processing result.

18. The server of claim 15, wherein the first processing result is a result processed by utterance processing capability of a first level, and
    wherein the at least one processor is configured to acquire the second processing result through utterance processing capability of a second level that is higher than the first level.

19. The server of claim 15, wherein the at least one processor is configured to, if the electronic device directs to abort the utterance processing, abort the processing of the received utterance.

20. The server of claim 15, wherein the server comprises processing capability that is higher than an utterance processing capability of the electronic device.

* * * * *